No. 890,359.
PATENTED JUNE 9, 1908.
A. O. HUBBARD.
WHEELBARROW.
APPLICATION FILED MAY 17, 1907.
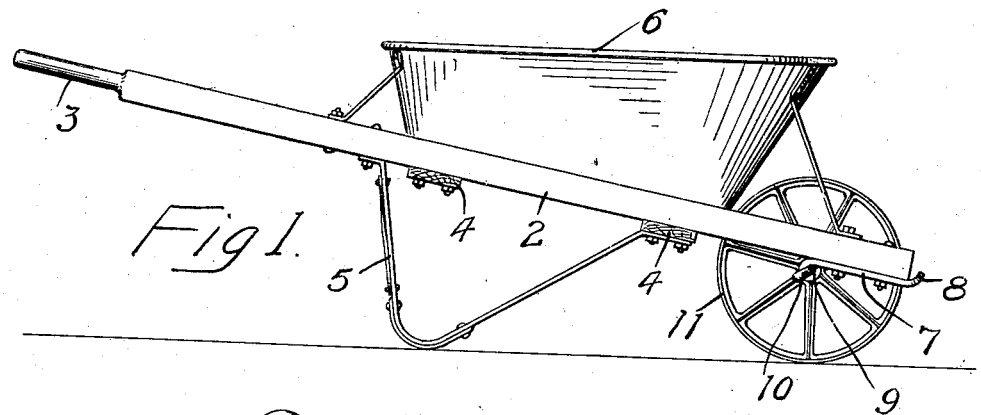
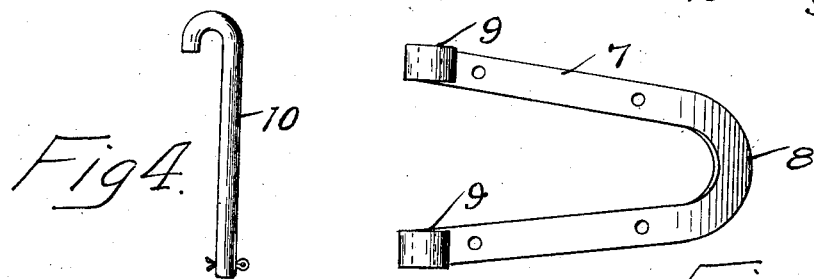
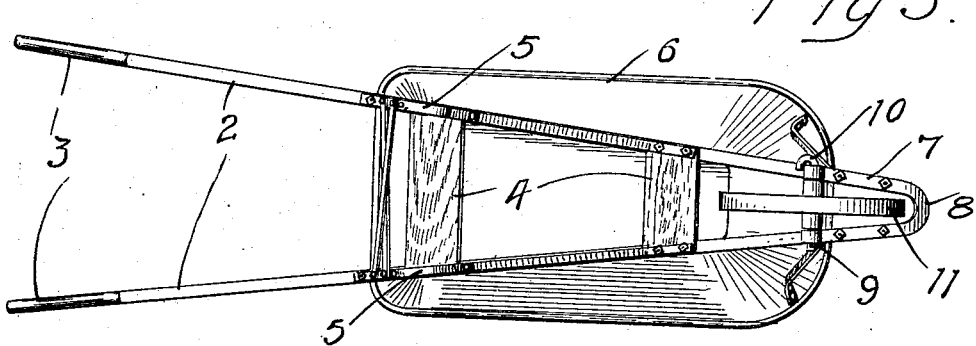
WITNESSES
INVENTOR
ARTHUR O. HUBBARD
BY
HIS ATTORNEYS

UNITED STATES PATENT OFFICE.

ARTHUR O. HUBBARD, OF MINNEAPOLIS, MINNESOTA.

WHEELBARROW.

No. 890,359.  Specification of Letters Patent.  Patented June 9, 1908.

Application filed May 17, 1907. Serial No. 374,281.

*To all whom it may concern:*

Be it known that I, ARTHUR O. HUBBARD, of Minneapolis, Hennepin county, Minnesota, have invented certain new and useful Improvements in Wheelbarrows, of which the following is a specification.

The object of my invention is to provide means on which the barrow can be conveniently tilted or turned to discharge its load.

A further object is to provide means for rigidly securing the forward ends of the handles or side rails together, and also to provide a strong substantial support or bearing for the wheel.

The invention consists generally in a barrow having side rails or handles and a metallic yoke secured to the forward ends of said rails and forming a rigid connection between them.

Further, the invention consists in a yoke having a forwardly projecting nose on which the barrow is tilted to discharge its load.

Further, the invention consists in a yoke connecting the forward ends of the side rails and having bearings for the wheel axle.

In the accompanying drawings, forming part of this specification, Figure 1 is a side elevation of the barrow embodying my invention. Fig. 2 is a bottom view of the same. Fig. 3 is a view of the yoke on the nose of which the barrow is tilted. Fig. 4 illustrates the axle bolt of the barrow wheel.

In the drawing, 2 represents the side bars of the barrow diverging from their forward toward their rear ends and terminating in handles 3. Cross bars 4 are provided, connecting the side bars. Legs 5 are secured to the bars and a tray 6 is supported upon the bars and braced in any suitable manner. The forward ends of the rails are near one another and are connected by a U-shaped steel yoke 7 that is bolted to the bars and has a forwardly projecting upwardly turned nose 8 which extends beyond the bars and forms a support and pivot for the barrow when it is raised up on end and tilted to discharge its load.

The yoke is provided with eyes 9 to receive an axle bolt 10 on which the barrow wheel 11 is mounted. The periphery of this wheel, as shown in Fig. 1, is in the rear of the nose 8 and will consequently be out of contact with the ground when the barrow is tilted to allow the contents of the tray to be dumped over the wheel. This barrow is provided with a large roomy tray and is of very strong, durable construction and designed particularly for handling a concrete or cement mixture or sand. The steel yoke not only forms a nose for the barrow on which it turns in dumping, but rigidly connects the forward ends of the side rails or handles holding them securely together and making a very durable substantial construction at a point where usually barrows are weak. The eyes formed at the ends of the yoke form bearings for the wheel axle and enable me to dispense with the usual means employed for mounting the axle in the barrow frame. The barrow is extremely rigid in construction, capable of carrying a heavy load and is very durable and will withstand long and continued hard usage.

I claim as my invention:

1. A wheel barrow having side rails converging toward their forward ends and provided with suitable handles at their rear ends, a tray supported on said rails, the forward ends of said rails projecting beyond said tray, a U-shaped yoke secured to the forward ends of said rails, said yoke having bearings in its rear portion, a wheel journaled in said bearings between said rails, and said yoke having an upwardly turned nose projecting beyond the ends of said rails and on which nose the barrow is tilted to discharge its load.

2. A wheel barrow comprising a tray and rails whereon said tray is mounted, the forward ends of said rails projecting beyond the forward portion of said tray, a yoke secured to said rails and having loops formed in its rear ends, a pin removably fitting within said loops, a wheel mounted on said pin and the forward end of said yoke projecting beyond said rails and the periphery of said wheel and having an upwardly turned nose for the purpose specified.

In witness whereof, I have hereunto set my hand this 15th day of May 1907.

ARTHUR O. HUBBARD.

Witnesses:
 I. M. PYATT,
 J. B. ERA.